United States Patent
Lee et al.

(10) Patent No.: US 12,347,844 B2
(45) Date of Patent: Jul. 1, 2025

(54) ELECTRODE ROLLING APPARATUS COMPRISING NON-COATING PORTION PRESSING PART AND ELECTRODE ROLLING METHOD USING THE SAME

(71) Applicant: LG Energy Solution, Ltd., Seoul (KR)

(72) Inventors: Jung Eun Lee, Daejeon (KR); Hwan Han Kim, Daejeon (KR); Jeong Soo Seol, Daejeon (KR); Jaehyuk Choi, Daejeon (KR); Soohyung Hong, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 204 days.

(21) Appl. No.: 17/641,296

(22) PCT Filed: May 20, 2021

(86) PCT No.: PCT/KR2021/095038
§ 371 (c)(1),
(2) Date: Mar. 8, 2022

(87) PCT Pub. No.: WO2021/235917
PCT Pub. Date: Nov. 25, 2021

(65) Prior Publication Data
US 2022/0285665 A1    Sep. 8, 2022

(30) Foreign Application Priority Data

May 22, 2020  (KR) .................. 10-2020-0061401
May 18, 2021  (KR) .................. 10-2021-0063928

(51) Int. Cl.
*H01M 4/04*    (2006.01)

(52) U.S. Cl.
CPC ....... *H01M 4/0435* (2013.01); *H01M 4/0471* (2013.01)

(58) Field of Classification Search
CPC ..... B21B 1/38; B21B 1/227; B21B 2001/383; B21B 2001/386; B21H 8/005;
(Continued)

(56) References Cited

U.S. PATENT DOCUMENTS 1,843,679 A * 2/1932 Jones .................. B21B 27/03
                                                72/199
2,639,660 A * 5/1953 Sunderhauf ............ B21H 8/005
                                                72/196
(Continued)

FOREIGN PATENT DOCUMENTS

CN    107646150 A    1/2018
EP    2523242 A1     11/2012
(Continued)

OTHER PUBLICATIONS

JP 11-267705A, Fujimura et al. Oct. 1999.*
(Continued)

*Primary Examiner* — Edward T Tolan
(74) *Attorney, Agent, or Firm* — Lerner David LLP (57) ABSTRACT

An electrode rolling apparatus including a non-coating portion pressing part for rolling a non-coating portion of an electrode substrate and an electrode rolling method using the same, making it is possible to prevent a swell from occurring in the non-coating portion region in the process of rolling the electrode substrate and enhance the manufacturing process efficiency.

14 Claims, 4 Drawing Sheets

(58) Field of Classification Search
CPC ... B21D 13/04; B21D 13/045; H01M 4/0435; H01M 4/0471; C21D 1/42
See application file for complete search history.

(56) References Cited

U.S. PATENT DOCUMENTS

| | | | | |
|---|---|---|---|---|
| 3,459,516 | A | * | 8/1969 | Dubuc .............. H01H 11/041 428/924 |
| 4,068,366 | A | * | 1/1978 | Hillesheim .......... B21D 31/046 428/596 |
| 4,361,085 | A | * | 11/1982 | Schutz ................ B31F 1/07 101/376 |
| 5,009,093 | A | * | 4/1991 | Quinn, Jr. ............. B21H 8/005 72/188 |
| 5,257,923 | A | * | 11/1993 | Kagawa .................. B30B 3/04 425/290 |
| 6,682,851 | B2 | * | 1/2004 | Sugikawa .............. H01M 4/82 29/2 |
| 7,147,453 | B2 | * | 12/2006 | Boegli ................... B31F 1/07 72/196 |
| 8,142,935 | B2 | | 3/2012 | Fujiwara et al. |
| 8,347,684 | B2 | * | 1/2013 | Coderre ................ B31F 1/07 72/197 |
| 8,637,189 | B2 | * | 1/2014 | Okabe .................. H01M 4/661 29/2 |
| 9,153,837 | B2 | | 10/2015 | Mitsuda et al. |
| 10,562,084 | B2 | * | 2/2020 | Sakaki ................ B32B 15/011 |
| 10,608,285 | B2 | | 3/2020 | Kim et al. |
| 11,196,031 | B2 | * | 12/2021 | Lee ..................... H01M 4/139 |
| 2002/0108422 | A1 | * | 8/2002 | Sugikawa .............. H01M 4/70 72/186 |
| 2003/0121131 | A1 | | 7/2003 | Fujiwara et al. |
| 2005/0115295 | A1 | * | 6/2005 | Pont ..................... B21B 1/227 72/252.5 |
| 2009/0325045 | A1 | | 12/2009 | Miyahisa et al. |
| 2012/0045689 | A1 | | 2/2012 | Okabe et al. |
| 2012/0288756 | A1 | | 11/2012 | Kim |
| 2017/0333969 | A1 | * | 11/2017 | Oei ......................... B44B 5/00 |
| 2018/0226630 | A1 | | 8/2018 | Yanai et al. |
| 2018/0337392 | A1 | | 11/2018 | Lee et al. |
| 2020/0335243 | A1 | | 10/2020 | Seo |
| 2022/0238855 | A1 | | 7/2022 | Enokihara et al. |

FOREIGN PATENT DOCUMENTS

| | | | | | |
|---|---|---|---|---|---|
| GB | | 2109293 A | * | 6/1983 | ............ B21D 13/04 |
| JP | | 2000012002 A | | 1/2000 | |
| JP | | 2006-086057 A | | 3/2006 | |
| JP | | 2008066050 A | | 3/2008 | |
| JP | | 2013030360 A | | 2/2013 | |
| JP | | 2013246971 A | | 12/2013 | |
| JP | | 5390721 B1 | | 1/2014 | |
| JP | | 2014032876 A | | 2/2014 | |
| JP | | 2015026562 A | | 2/2015 | |
| JP | | 2015057796 A | | 3/2015 | |
| JP | | 2017084545 A | | 5/2017 | |
| JP | | 2017-228349 A | | 12/2017 | |
| JP | | 2019033041 A | | 2/2019 | |
| JP | | 2019102172 A | | 6/2019 | |
| KR | | 101099903 B1 | | 12/2011 | |
| KR | | 20120035119 A | | 4/2012 | |
| KR | | 20120068341 A | | 6/2012 | |
| KR | | 20120126303 A | | 11/2012 | |
| KR | | 101255975 B1 | | 4/2013 | |
| KR | | 20160087251 A | | 7/2016 | |
| KR | | 20160141448 A | | 12/2016 | |
| KR | | 20170060724 A | | 6/2017 | |
| KR | | 101765773 B1 | | 8/2017 | |
| KR | | 101767636 B1 | | 8/2017 | |
| KR | | 20180004588 A | | 1/2018 | |
| KR | | 20180111711 A | | 10/2018 | |
| KR | | 20190054917 A | | 5/2019 | |
| WO | | 2018-048143 A1 | | 3/2018 | |

OTHER PUBLICATIONS

JP 63-84701A, Toge et al. Apr. 1998.*
DE 4308809A1, Schlott Sep. 1994.*
JP 2012-79582A, Kazama Apr. 2012.*
JP 2-40986A, Yamamoto et al. Feb. 1990.*
Translation JP 2-40986A, Yamamoto Feb. 1990.*
JP 2012-79592A, Kazama Apr. 2012.*
Translation JP 2012-79592A, Kazama Apr. 2012.*
JP 53-135861A, Honjo et al. Nov. 1978.*
Translation JP 53-135861A, Honjo et al. Nov. 1978.*
JP 54-149352A, Iwanami et al. Nov. 1979.*
GB 2515559A, Kaljura et al. Dec. 2014.*
Jeong et al. KR 2010-0116027, Oct. 2010.*
International Search Report for PCTKR2021095038 dated Sep. 8, 2021, 3 pgs.
International Search Report for Application No. PCT/KR2022/006831 mailed Aug. 26, 2022, pp. 1-4. [See p. 2-3, categorizing the cited references].
Extended European Search Report including Written Opinion for Application No. 21808523.1 dated Mar. 31, 2023, pp. 1-10.
Search Report dated Feb. 20, 2024 from Chinese Office Action for Application No. 202180005278.6 issued Mar. 1, 2024. 3 pgs.

* cited by examiner

ELECTRODE ROLLING APPARATUS COMPRISING NON-COATING PORTION PRESSING PART AND ELECTRODE ROLLING METHOD USING THE SAME

CROSS-REFERENCE TO RELATED APPLICATIONS

This application is a national phase entry under 35 U.S.C. § 371 of International Application No. PCT/KR2021/095038, filed on May 20, 2021, which claims priority from Korean Patent Application No. 10-2020-0061401, filed on May 22, 2020, and Korean Patent Application No. 10-2021-0063928 filed on May 18, 2021, the entire contents of which are incorporated herein by reference.

TECHNICAL FIELD

The present invention relates to an electrode rolling apparatus comprising a non-coating portion pressing part for rolling a non-coating portion of an electrode substrate and an electrode rolling method using the same.

BACKGROUND ART

Due to increased technology development and demand for mobile devices, the demand for secondary batteries is also increasing rapidly. Among the secondary batteries, a lithium secondary battery is widely used as an energy source of various electronic products as well as various mobile devices, in that an energy density and an operating voltage are high and the preservation and lifetime characteristics are excellent.

As the application field of the secondary battery is widened, the demand for a higher capacity secondary battery is rapidly increasing. As a method of increasing the capacity of the secondary battery, research on a technology of increasing a loading amount of an electrode composite layer has been conducted. However, when the loading amount of the electrode composite layer is increased, a volume increase of the electrode is caused. In order to reduce the volume of the electrode, a process of rolling the electrode at a higher pressure is required.

Figure 1:
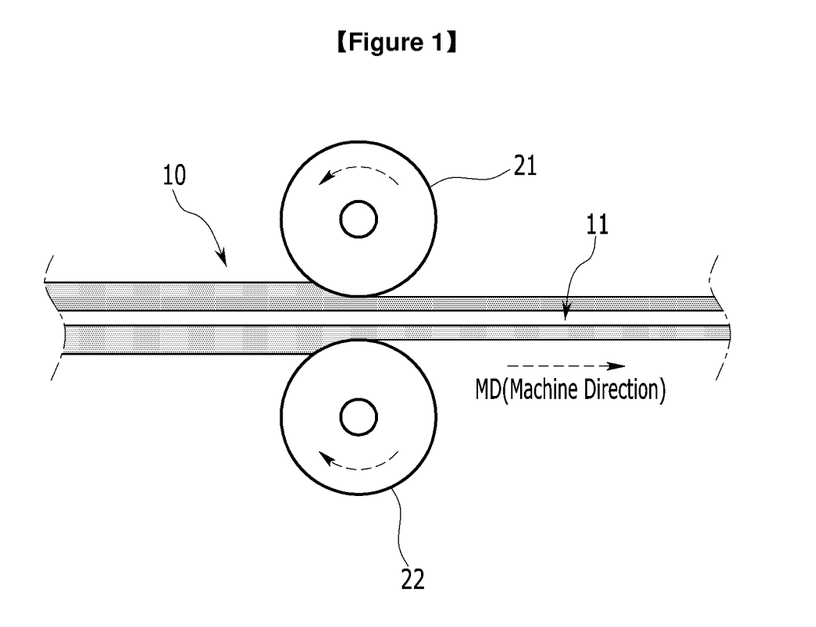
FIG. 1 is a diagram illustrating an electrode rolling process in related art.

FIG. 1 is a schematic view illustrating a rolling process for a conventional electrode substrate. Referring to FIG. 1, an electrode substrate 10 of a structure in which electrode composite layers are coated on both sides of a current collector layer formed of an aluminum foil is rolled while passing through a pair of rolling rollers 21 and 22. Through the process in which the electrode substrate 10 is rolled, the density of the electrode composite layer is increased and the volume thereof is reduced. However, in the process of rolling the electrode substrate 10 at the high pressure, there is a problem that a swell occurs in a side surface portion of the electrode substrate 10, particularly a non-coating portion 11 and a process failure rate increases.

Therefore, there is a need for a technique capable of minimizing the volume increase of the electrode and reducing a process failure even while increasing the loading amount of the electrode composite layer.

PRIOR ARTS

Patent Document (Patent Document 1) Korean Patent Registration No. 1765773

DISCLOSURE

Technical Problem

The present invention has been made in an effort to provide an electrode rolling apparatus comprising a non-coating portion pressing part for rolling a non-coating portion of an electrode substrate and an electrode rolling method using the same

Technical Solution

The present technology provides an electrode rolling apparatus for rolling an electrode substrate including a current collector layer and an electrode composite layer formed on one side or both sides of the current collector layer. In one example, the electrode rolling apparatus according to the present invention includes a non-coating portion pressing part for pressing a non-coating portion region of the electrode substrate to form a pattern; and an electrode rolling part for rolling the electrode substrate.

In one example, the non-coating portion pressing part includes a pair of non-coating portion rolling rollers for pressing the non-coating portion region of the electrode substrate, and at least one of the pair of non-coating portion rolling rollers has a structure with surface unevenness.

In another example, the non-coating portion pressing part includes a pair of non-coating portion rolling rollers for pressing the non-coating portion region of the electrode substrate. At this time, the pair of non-coating portion rolling rollers has different hardness.

In addition, in the pair of non-coating portion rolling rollers, one non-coating portion rolling roller has a structure with surface unevenness and the other non-coating portion rolling roller has a structure without surface unevenness.

In one example, the pair of non-coating portion rolling rollers may have different hardness. The pair of non-coating portion rolling rollers may include a first non-coating portion rolling roller having a structure with surface unevenness and a second non-coating portion rolling roller having a structure without unevenness formed on the surface The first non-coating portion rolling roller may have hardness higher than that of the second non-coating portion rolling roller.

In one example, the electrode rolling apparatus according to the present invention further includes a non-coating portion induction heating part induction-heating the non-coating portion region of the electrode substrate. At this time, the non-coating portion pressing part may be located at one or two or more selected from a front end of the non-coating portion induction heating part, between the non-coating portion induction heating part and the electrode rolling part, and a rear end of the electrode rolling part.

In a specific example, the non-coating portion induction heating part may induction-heat a partial region of the coating portion and an entire region of the non-coating portion based on a boundary line between the coating portion and the non-coating portion of the electrode substrate In one example, an insulation coating layer may be covered in the boundary line between the coating portion and the non-coating portion of the electrode substrate.

In one example, the non-coating portion pressing part may be located at one or two or more selected from a front end of the non-coating portion induction heating part, between the non-coating portion induction heating part and the electrode rolling part, and a rear end of the electrode rolling part.

In one example, the non-coating portion pressing part may be located at one or two selected from the front end of the electrode rolling part or the rear end of the electrode rolling part.

In one example, the electrode rolling part may include a pair of rolling rollers for pressing a region including the coating portion of the electrode substrate.

In another example, the electrode rolling apparatus according to the present invention further include a drying part for heating and drying the electrode substrate, wherein the drying part has a structure which is located downstream of the electrode rolling part or located on the same line to include the electrode rolling part.

Further, the present technology provides an electrode rolling method for rolling an electrode substrate using the electrode rolling apparatus described above, and specifically, provides a method for rolling an electrode substrate including a current collector and an electrode composite layer formed on one surface or both surfaces of the current collector. In one example, the electrode rolling method according to the present invention includes a non-coating portion pressing step of pressing a non-coating portion region of the electrode substrate to form a pattern; and an electrode rolling step of rolling the electrode substrate.

In one example, in non-coating portion pressing step, the non-coating portion regions formed on both side surfaces of the electrode substrate are pressed by the pair of non-coating portion rolling rollers to form an unevenness pattern, respectively.

In a specific example, the unevenness pattern has a shape of repeated mountains and valleys, an average distance between the mountains is in the range of 0.5 to 10 mm, and an average height difference between the mountain and valley is in the range of 0.1 to 5 mm.

In one example, the electrode rolling method according to the present invention may further include a non-coating portion induction heating step of induction-heating the non-coating portion region of the electrode substrate. At this time, the non-coating portion pressing step may be performed between the non-coating portion induction heating step and the electrode rolling step or/and at the rear end of the electrode rolling step.

In one specific example, in the non-coating portion induction heating step, the non-coating portion region of the electrode substrate is heated at a temperature in the range of 100 to 300° C.

Advantageous Effects

According to the present technology, it is possible to prevent a swell from occurring in a non-coating portion region in the process of rolling the electrode substrate and increase the manufacturing process efficiency.

DETAILED DESCRIPTION

Hereinafter, the present technology will be described in detail. Terms and words used in the present specification and the appended claims should not be interpreted as being limited to typical or dictionary meanings, but should be interpreted as meanings and concepts which comply with the technical spirit of the present invention, based on the principle that an inventor can appropriately define the concept of the term to describe his/her own invention in the best manner.

The present disclosure relates to an electrode rolling apparatus, and specifically, provides an apparatus for rolling an electrode substrate comprising a current collector layer and an electrode composite layer formed on one side or both sides of the current collector layer. In one exemplary embodiment, the electrode rolling apparatus according to the present invention comprises: a non-coating portion pressing part for pressing a non-coating portion region of an electrode substrate to form a pattern; and an electrode rolling part for rolling the electrode substrate.

As a method for implementing a high density electrode, the electrode substrate is rolled to increase a nip pressure. In the process, there is a problem that a swell occurs in a side portion of the electrode substrate, particularly, the non-coating portion region and a process failure rate increases. In the present technology, it has been confirmed that the non-coating portion of the electrode substrate is pressed by the non-coating portion pressing part to form a pattern, so that the occurrence of the swell described above may be significantly reduced even if the electrode substrate is rolled at a high nip pressure. Further, when the swell of the electrode substrate is reduced, the process failure rate may be lowered and furthermore, a winding amount can be increased when the electrode substrate is wound. Therefore, by applying the electrode rolling apparatus according to the present disclosure to the manufacture of the electrode, the process efficiency can be significantly increased.

In one exemplary embodiment, the non-coating portion pressing part comprises a pair of non-coating portion rolling rollers for pressing the non-coating portion region of the electrode substrate and any one of the pair of non-coating portion rolling rollers has a structure with surface unevenness. The non-coating portion region of the electrode substrate is pressed by using the pair of non-coating portion rolling rollers facing each other. At this time, in the pair of non-coating portion rolling rollers, at least one non-coating portion rolling roller has a structure with surface unevenness and in the non-coating portion region of the electrode substrate, an unevenness pattern corresponding to the surface unevenness of the non-coating portion rolling roller is formed.

In another exemplary embodiment, the surface unevenness formed on the non-coating portion rolling roller have a shape aligned in a direction having an inclined angle of 60° to 150° with a machine direction (MD) of the electrode substrate. The range of the inclined angle is 60° to 120°, 80° to 150°, or 75° to 105°. The surface unevenness are formed in a direction having the inclined angle in the range with the machine direction (MD) of the electrode substrate to solve the stress applied to the non-coating portion of the electrode substrate and minimize the occurrence of the swell. For example, the surface unevenness has a shape aligned in a direction vertical to the machine direction (MD) of the electrode substrate.

In a specific exemplary embodiment, the non-coating portion pressing part includes a pair of non-coating portion rolling rollers of pressing the non-coating portion region of the electrode substrate, and in the pair of non-coating portion rolling rollers, any one non-coating portion rolling roller has a structure with surface unevenness and the other non-coating portion rolling roller has a structure in which an unevenness pattern is not formed. For example, when the electrode substrate has a structure in which the non-coating portions are formed on both sides thereof, the non-coating portion pressing part includes two pairs of non-coating portion rolling rollers for pressing the non-coating portions of the both sides of the electrode substrate. Among the rollers, based on a pair of non-coating portion rolling rollers, a non-coating portion rolling roller for pressing the electrode substrate from an upper portion or one side has a structure with surface unevenness and a non-coating portion rolling roller for pressing the electrode substrate from a lower portion or the other side has a structure in which the unevenness pattern is not formed on the surface.

The non-coating portion rolling roller (first non-coating portion rolling roller) for pressing the electrode substrate from the upper portion or one side serves to apply the unevenness pattern to the non-coating portion of the electrode substrate and the non-coating portion rolling roller (second non-coating portion rolling roller) for pressing the electrode substrate from the lower portion or the other side serves to induce and support the transfer of the electrode substrate. In this case, the non-coating portion rolling roller (second non-coating portion rolling roller) for pressing the electrode substrate from the lower portion or the other side may have a structure with relatively lower hardness than the first non-coating portion rolling roller and as a result, the non-coating portion of the electrode substrate is supported to induce the unevenness pattern to be formed on the non-coating portion. At this time, when the hardness of the first non-coating portion rolling roller is smaller than the hardness of the second non-coating portion rolling roller, even though the non-coating portion pressing part according to the exemplary embodiment rolls the non-coating portion, it is difficult to improve an elongation deviation of the non-coating portion to a coating portion, so that the folding of the non-coating portion or the wrinkle occurrence may occur. Specifically, the first non-coating portion rolling roller with sawteeth for applying a force to the non-coating portion needs to be harder, so that the elongation may substantially occur well while the second non-coating portion rolling roller and the electrode substrate are pressed. When the hardness of the first non-coating portion rolling roller is smaller than the hardness of the second non-coating portion rolling roller, the sawtooth shape is deformed when the pressure is applied, and rather, the wrinkle and folding phenomena in the process are expressed and the deterioration of the elongation improvement effect and the deterioration of the quality may be caused.

Further, when the first non-coating portion rolling roller and the second non-coating portion rolling roller are formed of the same material to have the same hardness, the damage to a metal file such as tearing of the electrode substrate and the like is generated or an effect of the non-coating portion pressing part may not be exhibited. Since this is rolling for increasing the elongation of the non-coating portion foil itself instead of thinly making the thickness of an electrode composite layer by rolling the electrode composite layer on a current collector foil like a case of rolling the coating portion, the conditions thereof may be different from the conditions (when the coating portion is rolled, upper and lower pressing rollers have the same hardness) when rolling the coating portion.

In the electrode rolling apparatus according to an exemplary embodiment of the present invention, it is preferred that a friction coefficient of the first non-coating portion rolling roller is lower than the friction coefficient of the second non-coating portion rolling roller. If the friction coefficient of the first non-coating portion rolling roller is larger than the friction coefficient of the second non-coating portion rolling roller, a slip phenomenon occurs, and thus, it is difficult to uniformly roll the non-coating portion by the non-coating portion pressing part according to the exemplary embodiment, and accordingly, it may be difficult to improve the folding and wrinkle problems of the non-coating portion.

In some cases, the non-coating portion rolling roller for pressing the electrode substrate from the upper portion or one side is formed with two rollers to correspond to the non-coating portions at both sides of the electrode substrate and the non-coating portion rolling roller for pressing the electrode substrate from the lower portion or the other side can have a structure formed with one roller.

In yet another exemplary embodiment, the non-coating portion pressing part includes a pair of non-coating portion rolling rollers for pressing the non-coating portion region of the electrode substrate, and each non-coating portion rolling roller has a structure with an unevenness pattern. All of the pair of non-coating portion rolling rollers forming the non-coating portion pressing part have the structure with the unevenness pattern, and as a result, may impart a surface unevenness structure formed by pressing the non-coating portion region of the electrode substrate from both sides. In this case, the uneven structure may be more clearly imparted to the non-coating portion region of the electrode substrate, At least one of the non-coating portion rolling rollers forming the non-coating portion pressing part may be formed of at least one of aluminum or alloys thereof, stainless and a plastic material. For example, a pair of rollers forming the non-coating portion pressing part is formed of an engineering plastic material with high hardness. As another example, the non-coating portion pressing part includes a pair of non-coating portion rolling rollers, but one non-coating portion rolling roller is formed of an engineering plastic material with high strength and high hardness, and the other non-coating portion rolling roller may have structure formed of a plastic material or rubber material with relatively low hardness in a range of 90 F or less or 50 to 90 F based on Vickers hardness.

In the present disclosure, the coating portion refers to a region on which the electrode composite layer of the current collector layer is coated and the non-coating portion refers to a region on which the electrode composite layer of the current collector layer is not coated. Accordingly, the coating portion and the non-coating portion have different laminated structures and thicknesses, and the stress applied to the electrode substrate is concentrated in a boundary line between the coating portion and the non-coating portion. In the present technology, in order to solve the stress applied to the electrode substrate, an induction heating part, specifically, a non-coating portion induction heating part is further included.

In one exemplary embodiment, the electrode rolling apparatus according to the present invention may further include a non-coating portion induction heating part which induced-heats the non-coating portion region of the electrode substrate. It is preferred that the non-coating portion induction heating part is mainly used when a positive electrode is rolled, and is not applied when a negative electrode is rolled. Further, when the positive electrode is rolled, the non-coating portion pressing part may be located at one or two or more selected from the group consisting of a front end of the non-coating portion induction heating part, between the non-coating portion induction heating part and the electrode rolling part, and a rear end of the electrode rolling part.

The non-coating portion induction heating part has an effect of solving the stress accumulated while the non-coating portion of the electrode substrate passes through the non-coating portion pressing part and equalizing the elongation of metal foil forming the current collector. The non-coating portion induction heating part, for example, has a structure with two heating surfaces to cover the non-coating portions formed on both sides of the electrode substrate.

The non-coating portion induction heating part induction-heats the non-coating portion of the electrode substrate, and specifically, induction-heats a partial region of the coating portion and an entire region of the non-coating portion based on a boundary line between the coating portion and the non-coating portion of the electrode substrate. For example, the induction heating part has two heating surfaces and the heating surface of each induction heating part has a ratio (MD:TD) of a length in a transverse direction (TD) to a length of a machine direction (MD) in the range of 30:70 to 70:30, 30:70 to 45:55, or 55:45 to 70:30. In addition, for example, an area of each heating surface of the induction heating part is in the range of 1,300 to 2,000 mm$^2$.

The non-coating portion induction heating part induction-heats the non-coating portion region of the electrode substrate, and for example, heats the non-coating portion region of the electrode substrate in the rang of 100 to 300° C. The non-coating portion region is heated at a temperature that is not too high to minimize the deformation of the metal foil forming the non-coating portion and the occurrence of the swell. At this time, the coating portion may be heated at a surface temperature in the range of 30 to 80° C.

On the other hand, when the negative electrode is rolled, it is preferred that the rolling apparatus of the present disclosure does not include the non-coating portion induction heating part. At this time, the non-coating portion pressing part may be located at one or two selected from the front end of the electrode rolling part or the rear end of the electrode rolling part.

In one exemplary embodiment, the electrode rolling part includes a pair of rolling rollers for pressing a region including the coating portion of the electrode substrate. For example, the electrode rolling part has a structure for pressing the front surface of the electrode substrate including the coating portion region and the non-coating portion region. In another example, the electrode rolling part may also have a structure of pressing the coating portion region of the electrode substrate.

In yet another exemplary embodiment, the electrode rolling part presses the electrode substrate at a nip pressure in the range of 0.5 to 6 Ton/cm. Specifically, in the electrode rolling part, the nip pressure applied to the electrode substrate may be in the range of 1.8 to 6 Ton/cm, 2 to 6 Ton/cm, 2.5 to 6, 2.8 to 6, or 2.8 to 4 Ton/cm. As a method for implementing a high density electrode, the nip pressure applied to the electrode substrate is increased. In the present technology, even though the electrode substrate is rolled at a relatively high nip pressure in the electrode rolling part, a swell occurrence degree may be significantly lowered.

In yet another exemplary embodiment, the electrode rolling apparatus according to the present invention further includes a drying part for heating and drying the electrode substrate. Specifically, the drying part has a structure which is located downstream of the electrode rolling part or located on the same line to include the electrode rolling part. For example, in the present technology, the electrode substrate may be dried in a drying chamber after rolling the electrode substrate. In another example, in the present invention, it is also possible to perform drying on the electrode substrate while rolling the electrode substrate. In yet another example, in the present invention, the electrode rolling part may have structure including a pressing roller heated by an embedded heating foil and thus, it is possible to roll the electrode substrate through the heated pressing roller.

Further, the present disclosure provides an electrode rolling method, and specifically, provides a method of rolling an electrode substrate including a current collector and an electrode composite layer formed on one surface or both surfaces of the current collector. In one exemplary embodiment, the electrode rolling method according to the present technology includes a non-coating portion pressing step of pressing a non-coating portion region of the electrode substrate to form a pattern; and an electrode rolling step of rolling the electrode substrate.

In the present technology, it has been confirmed that the non-coating portion of the electrode substrate is pressed by the non-coating portion pressing part to form a pattern, and as a result, even if the electrode substrate is rolled at a high nip pressure, the occurrence of the swell of the non-coating portion may be significantly reduced, the wrinkle of the non-coating portion is alleviated, and the folding may be improved. Further, when the swell of the electrode substrate is reduced or the wrinkle occurrence and the folding of the non-coating portion are improved, the process failure rate may be lowered and furthermore, a winding amount can be increased when the electrode substrate is wound. Therefore, in the electrode rolling method according to the present technology, the process efficiency may be increased and the product failure may be lowered when the electrode is manufactured.

In one exemplary embodiment, in the non-coating portion pressing step, the non-coating portion region formed on both side surfaces of the electrode substrate are pressed by the pair of non-coating portion rolling rollers to form an unevenness pattern, respectively. Further, the non-coating portion region of the electrode substrate is pressed by using the non-coating portion rolling rollers facing each other. At this time, in the pair of non-coating portion rolling rollers, at least one non-coating portion rolling roller has a structure with surface unevenness. For example, in the pair of non-coating portion rolling rollers, one non-coating portion rolling roller has a structure with surface unevenness, or the pair of non-coating portion rolling rollers all have a structure with surface unevenness. The unevenness pattern is formed in the non-coating portion region of the electrode substrate as a shape corresponding to the surface unevenness of the non-coating portion rolling roller. The shape, the material, and the like of the roller to be applied to the non-coating portion pressing step are as described above.

In yet another exemplary embodiment, in the non-coating portion pressing step, in the non-coating portion region of the electrode substrate, the surface unevenness aligned in a direction having an inclined angle of 60° to 150° with a machine direction (MD) of the electrode substrate is formed. The unevenness pattern formed in the non-coating portion region of the electrode substrate corresponds to the surface shape of the pressing roller. Specifically, the range of the inclined angle is 60° to 120°, 80° to 150°, or 75° to 105°. The unevenness pattern is formed in a direction having the inclined angle in the range with the machine direction (MD) of the electrode substrate to solve the stress applied to the non-coating portion of the electrode substrate and minimize the occurrence of the swell.

For example, the unevenness pattern has a shape aligned in a direction vertical to the machine direction (MD) of the electrode substrate.

In a specific embodiment, the unevenness pattern formed in the non-coating portion region of the electrode substrate has a shape of repeated mountains and valleys. For example, an average distance between the mountains is in the range of 0.5 to 10 mm, and an average height difference between the mountain and valley is in the range of 0.1 to 5 mm. As another example, the average distance between the mountains is in the range of 1 to 5 mm, and the average height difference between the mountain and valley is in the range of 0.3 to 2.5 mm. The average distance between the mountains is more preferably in the range of 1 to 2 mm, and the average height difference between the mountain and valley is more preferably in the range of 0.4 to 0.8 mm. The unevenness pattern formed in the non-coating portion region of the electrode substrate can be variously modified according to specifications and applications of a product. In the present technology, by controlling the shape of the unevenness pattern to the above range, it is possible to inhibit a volume increase according to a pattern formation of the non-coating portion in a secondary battery assembly process while minimizing the occurrence of the swell of the non-coating portion.

In yet another exemplary embodiment, the electrode rolling method according to the present invention further includes a non-coating portion induction heating step of induction-heating the non-coating portion of the electrode substrate between the non-coating portion pressing step and the electrode rolling step. The non-coating portion induction heating step is a step of performing separately from the drying process of the electrode substrate. In the present technology, it was confirmed that the non-coating portion induction heating step is performed between the non-coating portion pressing step and the electrode rolling step to solve the stress of the non-coating portion and effectively inhibit the swell occurrence.

In the non-coating portion induction heating step, the stress of the non-coating portion is solved before the electrode rolling step, but the non-coating portion needs to be heated at a temperature that minimizes the deformation of the metal foil forming the current collector. To this end, in the non-coating portion induction heating step, the non-coating portion region of the electrode substrate may be heated at a temperature in the range of 100 to 300° C. Specifically, in the non-coating portion induction heating step, the non-coating portion of the electrode substrate is heated to the range of 100 to 250° C. or 150 to 200° C. In the non-coating portion induction heating step, the non-coating portion of the electrode substrate is heated to a relatively low temperature, which is to solve the stress of the non-coating portion before the electrode rolling step, but to minimize the deformation of the metal foil forming the current collector. In one exemplary embodiment, in the electrode rolling step, the electrode substrate is rolled at an average nip pressure in the range of 0.5 to 6 Ton/cm. Specifically, in the electrode rolling part, the nip pressure applied to the electrode substrate may be in the range of 1.8 to 6 Ton/cm, 2 to 6 Ton/cm, 2.5 to 6 Ton/cm, 2.8 to 6 Ton/cm, or 2.8 to 4 Ton/cm. As a method for implementing a high density electrode, the nip pressure applied to the electrode substrate is increased. In the present technology, even though the electrode substrate is rolled at a relatively high nip pressure in the electrode rolling part, a swell occurrence degree may be significantly lowered.

In one exemplary embodiment, while the electrode rolling method according to the present invention is performed, the electrode substrate is transferred in one direction (machine direction: MD), and a transfer rate is in the range of 10 to 1,100 m/min. For example, the rolling process may be performed while the transfer of the electrode substrate is stopped, but it is advantageous in process efficiency that each step is performed during the transferring of the electrode substrate. Specifically, the transfer rate of the electrode substrate is in the range of 10 to 1,000 m/min, 50 to 1,100 m/min, 60 to 200 m/min, 60 to 90 m/min, 70 to 90 m/min, 65 to 80 m/min or 75 to 85 m/min. The transfer rate of the electrode substrate is a range that does not degrade the process efficiency while maintaining the product uniformity according to rolling.

In one example, the electrode substrate means a substrate applied to the positive electrode and/or the negative electrode of the lithium secondary battery. The electrode substrate is applied to the positive electrode or the negative electrode through a process of stamping according to a shape of the electrode. The positive electrode has a structure in which a positive electrode active material layer having a double-layered structure is laminated on a positive electrode current collector. In one example, the positive electrode active material layer may include a positive electrode active material, a conductive material, a binder polymer, and the like, and may further include a positive electrode additive commonly used in the art, if necessary.

The positive electrode active material may be lithium-containing oxide, and may be the same or different. The lithium-containing oxide may use lithium-containing transition metal oxide.

For example, the lithium-containing transition metal oxide may be one or mixtures of at least two selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0≤y<1), $Li_xNi_{1-y}Mn_yO_2$ (0.5<x<1.3, 0≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x<1.3) and $Li_xFePO_4$ (0.5<x<1.3), and the lithium-containing transition metal oxide may also be coated with metal such as aluminum (Al) of metal oxide. Further, in addition to the lithium-containing transition metal oxide, at least one selected from the group consisting of sulfide, selenide, halide, and the like may be used.

The positive electrode active material may be included in the range of 94.0 to 98.5 wt % in the positive electrode active material layer. When the content of the positive electrode active material satisfies the above range, it is advantageous in terms of making a high-capacity battery, and imparting sufficient conductivity of the positive electrode or adhesion between electrode materials.

The current collector used in the positive electrode is a metal having a high conductivity, and may be a metal capable of easily adhering to a positive electrode active material slurry, and may be used so long as there is no reactivity in a voltage range of an electrochemical device. Specifically, non-limiting examples of the positive electrode current collector include foils prepared by aluminum, nickel or combinations thereof.

The positive electrode active material layer further includes a conductive material. The conductive material is generally added in 1 to 30 wt % based on the total weight of the mixture containing the positive electrode active material. Such a conductive material is not particularly limited as long as it has conductivity without causing chemical changes to the secondary battery. For example, the conductive material may use at least one selected from the group consisting of graphite such as natural graphite, and artificial graphite; carbon black such as carbon black, acetylene black, Ketjen black, Denka black, thermal black, channel black, furnace black, lamp black, and thermo black; conductive fiber such as carbon fiber, and metal fiber; metal powder such as carbon, aluminum, and nickel powders; conductive whiskeys such as zinc oxide, and potassium titanate; conductive oxides such as titanium oxide; polyphenylene derivatives, and the like.

The negative electrode has a structure in which a negative electrode active material layer having a double-layered structure is laminated on a negative electrode current collector. In one example, the negative electrode active material layer may include a negative electrode active material, a conductive material, and a binder polymer, and may further include a negative electrode additive commonly used in the art, if necessary.

The negative electrode active material may include carbon material, lithium metal, silicon, tin, or the like. When the carbon material is used as the negative electrode active material, low crystalline carbon, high crystalline carbon, etc. all may be used. The low crystalline carbon is representatively soft carbon and hard carbon, and the high crystalline carbon is representatively at least one high temperature plastic carbon selected from the group consisting of natural graphite, Kish graphite, pyrolytic carbon, mesophase pitch based carbon fiber, mesocarbon microbeads, mesophase pitches, petroleum orcoal tar pitch derived cokes, and the like.

Non-limiting examples of the current collector used in the negative electrode include copper, gold, nickel or copper alloys, foils manufactured by a combination thereof, or the like. In addition, the current collector may also be used by laminating substrates consisting of these materials.

In addition, the negative electrode may include a conductive material and a binder commonly used in the art.

Hereinafter, the present invention will be described in more detail with reference to drawings, embodiments, and the like. The present invention can make various modifications and may have various forms, and specific embodiments are illustrated in the drawings and will be described in detail in the specification. However, it should be understood that the present invention is not intended to be limited to a specific disclosed form, and includes all modifications, equivalents, and alternatives included in the spirit and technical scope of the present invention.

First Embodiment

Figure 2:
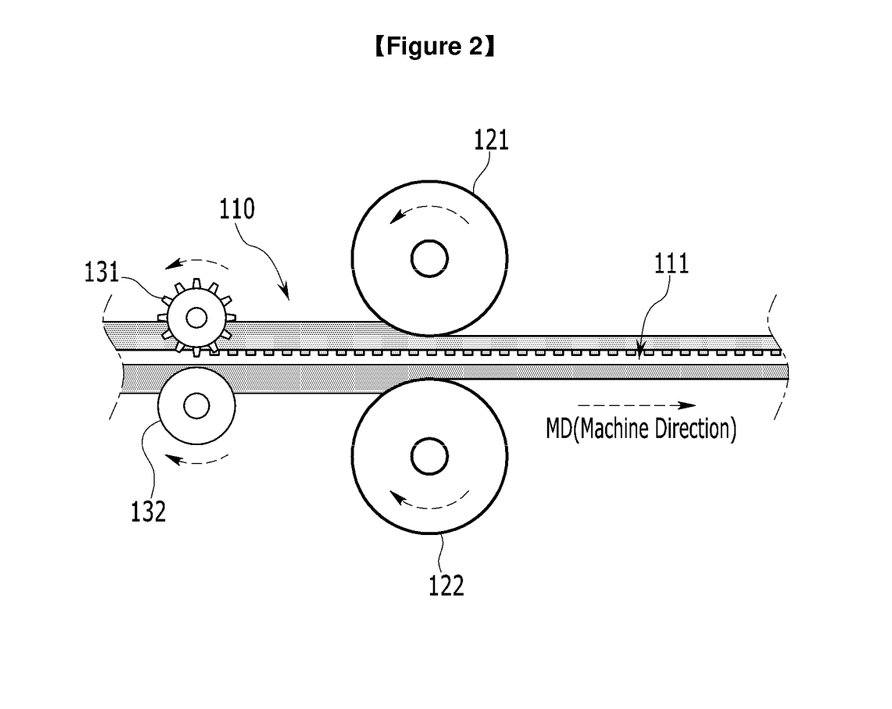
FIGS. 2 and 3 are a cross-sectional view and a plan view illustrating an electrode rolling process according to an exemplary embodiment of the present invention, respectively.
Figure 3:
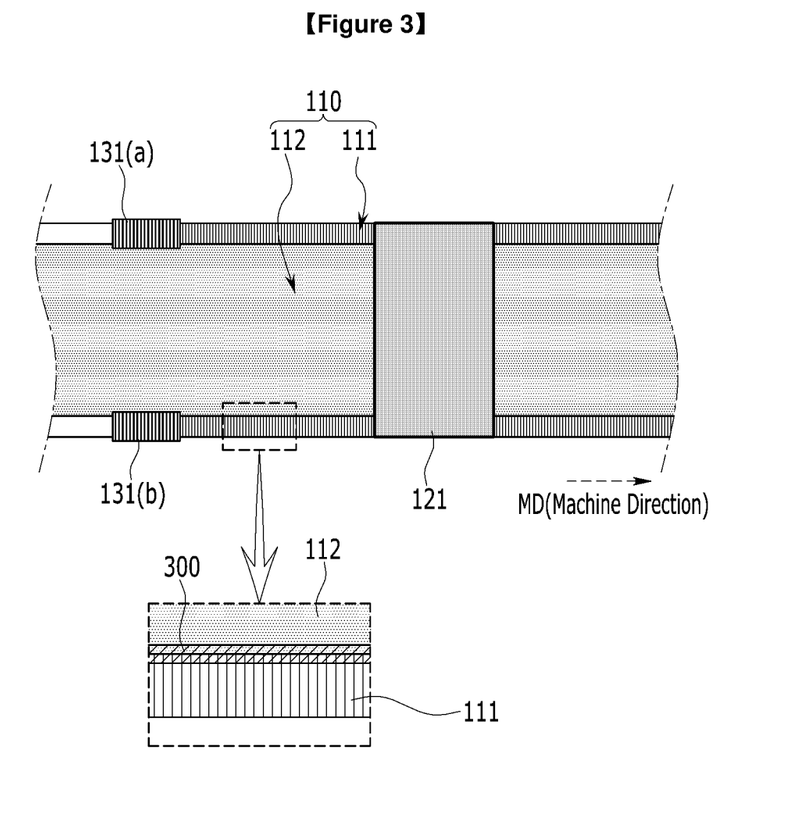

FIGS. 2 and 3 are schematic views illustrating an electrode rolling process according to an exemplary embodiment of the present invention, respectively, wherein FIG. 2 illustrates a cross-section view and FIG. 3 illustrates a plan view.

Referring to FIG. 2, the electrode substrate 110 including a current collector layer and electrode composite layers formed on both sides of the current collector layer is rolled. Specifically, the electrode substrate is rolled by the electrode rolling part after passing through the non-coating portion pressing part for pressing the non-coating portion 111 region of the electrode substrate 110 to form a pattern.

The non-coating portion pressing part includes a pair of non-coating portion rolling rollers 131 and 132 for pressing the non-coating portion 111 of the electrode substrate 110 from both sides. In the pair of non-coating portion rolling rollers 131 and 132, a first non-coating portion rolling roller 131 located at the upper portion has a structure with an unevenness pattern and a second non-coating portion rolling roller 132 located at the lower portion has a structure without an unevenness pattern on the surface. The first non-coating portion rolling roller 131 located at the upper portion serves to impart the unevenness pattern to the non-coating portion 111 of the electrode substrate 110 and the second non-coating portion rolling roller 132 located at the lower portion serves to support the non-coating portion 111 of the electrode substrate 110. For example, the first non-coating portion rolling roller 131 located at the upper portion is formed of engineering plastic with high hardness and the second non-coating portion rolling roller 132 located at the lower portion is formed of a plastic material or rubber material with relatively low hardness.

It is preferred that the first non-coating portion rolling roller 131 has higher hardness than the second non-coating portion rolling roller 132. Specifically, the first non-coating portion rolling roller 131 may be formed of a material with HB hardness of about 100 or more and the second non-coating portion rolling roller 132 may be formed of a material with HB hardness of about 70 or less. For example, as illustrated in Table 1 below, when the hardness of the first and second non-coating portion rolling rollers 131 and 132 has the range of the aforementioned condition, the non-coating portion is rolled by the non-coating portion pressing part according to the exemplary embodiment to implement an effect of controlling the swell of the non-coating portion and the lifting of the non-coating portion to a predetermined level or less. In Comparative Examples 1 and 2, it was confirmed that the folding and the wrinkling of the non-coating portion occur to cause an electrode defect.

TABLE 1

| | Upper roller (first non-coating portion rolling roller) | Lower roller (second non-coating portion rolling roller) | Electrode quality | Note |
|---|---|---|---|---|
| Exemplary embodiment | SUS material rolling roller | Rubber material rolling roller | Good | Lifting level of non-coating portion is confirmed as 4 mm or less |
| Comparative Example1 | Rubber material rolling roller | SUS material rolling roller | Poor | Folding/wrinkling of non-coating portion occur |
| Comparative Example2 | SUS material rolling roller | SUS material rolling roller | Poor | Folding/wrinkling of non-coating portion occur and/or non-coating portion foil damage |

SUS: Steel Use Stain ess

Referring to Table 1 above, when the hardness of the first non-coating portion rolling roller is larger than the hardness of the second non-coating portion rolling roller (Comparative Example 1), since the first non-coating portion rolling roller presses the non-coating portion, the elongation improvement effect of the non-coating portion is small and it is difficult to prevent the occurrence of folding and wrinkling of the non-coating portion. In addition, even when the hardness of the first non-coating portion rolling roller is equal to the hardness of the second non-coating portion rolling roller (Comparative Example 2), since the damage to a metal foil such as tearing of the electrode substrate occurs or the effect of rolling the non-coating portion by the non-coating portion pressing part is small, it is difficult to prevent the occurrence of folding and wrinkling of the non-coating portion.

The unevenness pattern formed on the first non-coating portion rolling roller 131 according to the exemplary embodiment may have about 36 to 150 sawteeth. The distribution density of the unevenness pattern may be represented by measuring a distance between the sawteeth in the non-coating portion rolling roller having a circular circumference and an angle between the sawteeth adjacent to each other in the center of the roller. In this regard, as illustrated in Table 2 below, when the number of sawteeth formed on the first non-coating portion rolling roller 131 is smaller than 36, actually, it is difficult to obtain an effect of reducing the electrode swell by rolling the non-coating portion by the non-coating portion pressing part, and when the number of sawteeth is greater than 150, the folding phenomenon of the non-coating portion may occur during acceleration or deceleration of the roller. Even when a flat non-coating portion rolling roller without a sawtooth phenomenon is used, the folding phenomenon of the non-coating portion may occur during acceleration or deceleration of the roller.

The electrode swell may refer to a phenomenon in which the electrode surface waves after the rolling.

TABLE 2

| Upper roller (first non-coating portion rolling roller) Sawtooth shape Distance between threads | Electrode quality | Note |
| --- | --- | --- |
| Flat roll (without sawteeth) | Poor | Lifting phenomenon of non-coating portion occur during acceleration or deceleration |
| 2.4° to 10° (36EA to 150EA) | Good | Lifting level of non-coating portion is confirmed as less than 4 mm |
| 1.0° 360EA | Poor | Folding of non-coating portion occur during acceleration or deceleration |

The electrode substrate 110 performs a rolling process in the electrode rolling part through the non-coating portion pressing part. The electrode rolling part includes a pair of rolling rollers 121 and 122 for pressing a front surface or a coating portion of the electrode substrate 110 from both sides. The pair of rolling rollers 121 and 122 press the coating portion of the electrode substrate 110 while rolling the electrode substrate under a condition of a nip pressure of 3.0 ton/cm to increase the density.

The electrode substrate 110 is transferred at a rate of 80 m/min through the electrode rolling process described above.

Referring to FIG. 3, the electrode substrate 110 includes a current collector layer and electrode composite layers formed on both sides of the current collector layer, and a region in which the electrode composite layers are coated on the current collector layer refers to a coating portion 112 and a region in which the electrode composite layers are not coated on the current collector layer refers to a non-coating portion 111.

The non-coating portion pressing part includes a pair of non-coating portion rolling rollers 131 and 132 for pressing both sides of the non-coating portion 111 of the electrode substrate 110, respectively. When observed above, upper non-coating portion rolling rollers 131a and 131b are located on the non-coating portions 111 of both side surfaces of the electrode substrate 110, respectively. An unevenness pattern formed on the non-coating portion 111 of the electrode substrate 110 by the upper non-coating portion rolling rollers 131a and 131b has a structure aligned in a direction vertical to an MD direction.

The electrode substrate 110 through the non-coating portion pressing part is rolled by the electrode rolling part. The electrode rolling part includes the pair of rolling rollers 121 and 122 for pressing the front surface or the coating portion of the electrode substrate 110 from both sides. The pair of rolling rollers 121 and 122 press the front surface of the electrode substrate 110 while rolling the electrode substrate under a condition of a nip pressure of 3.0 ton/cm to increase the density of the electrode composite layer formed on the coating portion.

The electrode substrate 110 is transferred at a rate of 80 m/min through the electrode rolling process described above.

Second Embodiment

Figure 4:
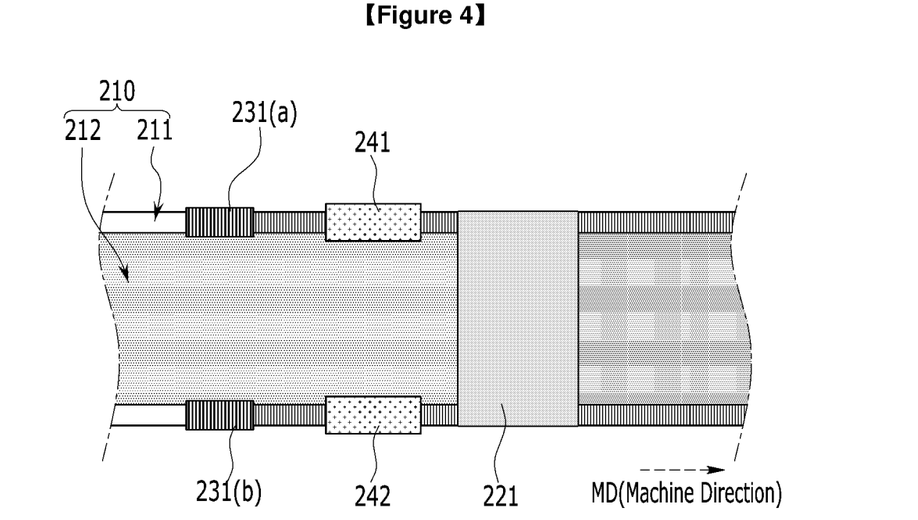
FIG. 4 is a plan view illustrating an electrode rolling process according to another exemplary embodiment of the present invention.

FIG. 4 is a plan view illustrating an electrode rolling process according to another exemplary embodiment of the present invention. Referring to FIG. 4, an electrode substrate 210 includes a current collector layer and electrode composite layers formed on both sides of the current collector layer, and a region in which the electrode composite layers are coated on the current collector layer refers to a coating portion 212 and a region in which the electrode composite layers are not coated on the current collector layer refers to a non-coating portion 211.

The non-coating portion pressing part includes upper non-coating portion rolling rollers 231a and 231b for pressing both sides of a non-coating portion 111 of the electrode substrate 210, respectively. When observed above, the non-coating portion rolling rollers 231a and 231b are located on the non-coating portions 211 of both side surfaces of the electrode substrate 210, respectively. An unevenness pattern formed on the non-coating portion 211 of the electrode substrate 210 by the pressing of the non-coating portion rolling rollers 231a and 231b is formed, and the formed unevenness pattern has a shape aligned in a direction vertical to an MD direction.

The non-coating portion 211 of the electrode substrate 210 through the non-coating portion pressing part is heated by non-coating portion induction heating parts 241 and 242. A heating temperature of the non-coating portion 211 in the non-coating portion induction heating parts 241 and 242 is about 75° C.

The electrode substrate 210 through the non-coating portion induction heating parts 241 and 242 is rolled by the electrode rolling part. The electrode rolling part includes the pair of rolling rollers 221 for pressing the front surface or the coating portion of the electrode substrate 210 from both sides. The pair of rolling rollers 221 press the front surface of the electrode substrate 210 while rolling the electrode substrate under a condition of a nip pressure of 3.0 ton/cm to increase the density of the electrode composite layer formed on the coating portion.

The electrode substrate 210 is transferred at a rate of 80 m/min through the electrode rolling process described above.

Referring back to FIG. 3, the electrode rolling process according to an exemplary embodiment of the present invention will be described.

Referring to FIG. 3, an electrode substrate with an electrode composite layer formed on an aluminum foil is supplied, and the supplied electrode substrate passes through a non-coating portion rolling part. The non-coating portion rolling part supports the electrode substrate by a lower non-coating portion rolling roller and an unevenness pattern is formed by an upper non-coating portion rolling roller located on the non-coating portion of the electrode substrate. The upper non-coating portion rolling roller has a shape formed with surface unevenness and in the non-coating portion of the electrode substrate, an unevenness pattern corresponding to the surface unevenness of the upper non-coating portion rolling roller is formed.

The electrode substrate includes a coating portion with the electrode composite layer on the aluminum foil and a non-coating portion without the electrode composite layer, and an insulation coating layer 300 is formed between the coating portion and the non-coating portion. At this time, the insulation coating layer may cover a boundary line between the coating portion and the non-coating portion.

The non-coating portion of the electrode substrate is rolled using the non-coating portion rolling roller with the surface unevenness. In the non-coating portion of the electrode substrate, the unevenness pattern corresponding to the surface unevenness of the non-coating portion rolling roller is formed.

Third Embodiment

Figure 5:
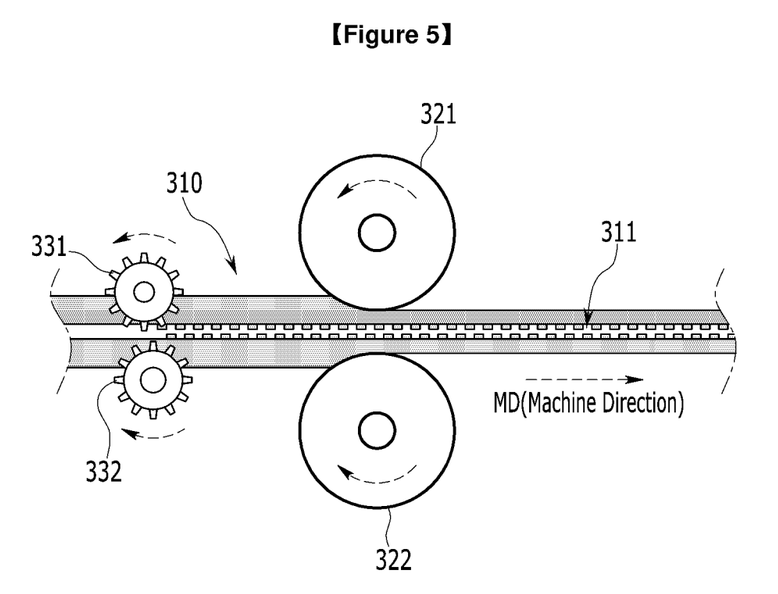
FIG. 5 is a plan view illustrating an electrode rolling process according to yet another exemplary embodiment of the present invention.

FIG. 5 is a plan view illustrating an electrode rolling process according to yet another exemplary embodiment of the present invention. Referring to FIG. 5, an electrode substrate 310 including a current collector layer and electrode composite layers formed on both sides of the current collector layer is rolled. Specifically, the electrode substrate is rolled by an electrode rolling part after passing through a non-coating portion pressing part for pressing a non-coating portion 311 region of the electrode substrate 310 to form a pattern.

The non-coating portion pressing part includes a pair of non-coating portion rolling rollers 331 and 332 for pressing the non-coating portion 311 of the electrode substrate 310 from both sides. The non-coating portion rolling rollers 131 and 132 have a structure with an unevenness pattern formed on the surface.

The electrode substrate 310 performs a rolling process in the electrode rolling part through the non-coating portion pressing part. The electrode rolling part includes a pair of rolling rollers 321 and 322 for pressing a front surface or a coating portion of the electrode substrate 310 from both sides. The pair of rolling rollers 321 and 322 press the coating portion of the electrode substrate 310 while rolling the electrode substrate under a condition of a nip pressure of 3.0 ton/cm to increase the density.

The electrode substrate 310 is transferred at a rate of 70 m/min through the electrode rolling process described above.

Hereinabove, the present invention has been described in more detail with reference to the drawings, the exemplary embodiments, and the like. However, the configurations disclosed in the drawings or the exemplary embodiments described in the present specification are merely one exemplary embodiment of the present invention and are not intended to represent all of the technical idea of the present invention. Therefore, it should be understood that various equivalents and modifications capable of replacing the configurations at the time of this application could be made.

EXPLANATION OF REFERENCE NUMERALS AND SYMBOLS 10, 110, 210, 310: Electrode substrate
21, 22, 121, 122, 221, 222, 321, 322: Rolling roller
11, 111, 211, 311: Non-coating portion
212: Coating portion
131, 131(a), 131(b), 132, 231(a), 232(b), 331, 332: Non-coating portion rolling roller
141, 142, 241, 242: Non-coating portion induction heating part

The invention claimed is:

1. An electrode rolling apparatus comprising:
an apparatus adapted for rolling an electrode substrate including a current collector layer and an electrode composite layer formed on one side or both sides of the current collector layer,
a non-coating portion pressing part including a pair of non-coating portion rolling rollers including a structure with surface unevenness for pressing a non-coating portion region of the electrode substrate to apply an unevenness pattern to the non-coating portion region of the electrode substrate; and
an electrode rolling part adapted for rolling the electrode substrate, and
a non-coating portion induction heating part configured to induction-heat a partial region of a coating portion and an entire region of the non-coating portion based on a boundary line between the coating portion and the non-coating portion of the electrode substrate,
wherein the pair of non-coating portion rolling rollers includes a first non-coating portion rolling roller located at an upper portion, arranged to be above the current collector layer, and made of a first material, and a second non-coating portion rolling roller located at a lower portion, arranged to be below the current collector, and made of a second material, and
a friction coefficient of a surface of the first material of the first non-coating portion rolling roller is lower than a friction coefficient of a surface of the second material of the second non-coating portion rolling roller.

2. The electrode rolling apparatus of claim 1, wherein:
the first non-coating portion rolling roller and the second non-coating portion rolling roller have a structure with surface unevenness.

3. The electrode rolling apparatus of claim 1, wherein:
the first non-coating portion rolling roller has a hardness higher than a hardness of the second non-coating portion rolling roller.

4. The electrode rolling apparatus of claim 1, wherein:
the first non-coating portion rolling roller has a structure with surface unevenness and the second non-coating portion rolling roller has a structure without unevenness formed on its surface.

5. The electrode rolling apparatus of claim 4, wherein:
the first non-coating portion rolling roller has a hardness higher than a hardness of the second non-coating portion rolling roller.

6. The electrode rolling apparatus of claim 1, wherein:
an insulation coating layer is covered in the boundary line between the coating portion and the non-coating portion of the electrode substrate.

7. The electrode rolling apparatus of claim 1, wherein:
the non-coating portion pressing part is located at one or more positions selected from: (i) a front end of the non-coating portion induction heating part, (ii) between the non-coating portion induction heating part and the electrode rolling part, or (iii) a rear end of the electrode rolling part.

8. The electrode rolling apparatus of claim 1, wherein:
the non-coating portion pressing part is located at one or more positions selected from: (i) a front end of the electrode rolling part or (ii) a rear end of the electrode rolling part.

9. The electrode rolling apparatus of claim 1, wherein:
the electrode rolling part includes a pair of rolling rollers adapted for pressing a region including the coating portion of the electrode substrate.

10. The electrode rolling apparatus of claim 1, further comprising:
a drying part adapted for heating and drying the electrode substrate,
wherein the drying part has a structure which is located downstream of the electrode rolling part or located on the same line to include the electrode rolling part.

11. An electrode rolling method comprising:
a method for rolling an electrode substrate including a current collector and an electrode composite layer formed on one surface or both surfaces of the current collector,
pressing a non-coating portion region of the electrode substrate using a pair of non-coating portion rolling rollers including a structure with surface unevenness to form an unevenness pattern on the non-coating portion region of the electrode substrate;
rolling the electrode substrate, and
induction-heating a partial region of a coating portion and an entire region of the non-coating portion based on a boundary line between the coating portion and the non-coating portion of the electrode substrate,
wherein the pair of non-coating portion rolling rollers includes a first non-coating portion rolling roller located at an upper portion of the current collector and made of a first material, and a second non-coating portion rolling roller located at a lower portion of the current collector and made of a second material, and
wherein a friction coefficient of a surface of the first material of the first non-coating portion rolling roller is lower than the friction coefficient of a surface of the second material of the second non-coating portion rolling roller.

12. The electrode rolling method of claim 11, wherein:
during the pressing the non-coating portion region,
the non-coating portion regions formed on both side surfaces of the electrode substrate are pressed by a pair of non-coating portion rolling rollers to form an unevenness pattern, respectively.

13. The electrode rolling method of claim 12, wherein:
the unevenness pattern has a shape of repeated mountains and valleys,
an average distance between the mountains is in a range of 0.5 to 10 mm, and
an average height difference between the mountain and the valley is in a range of 0.1 to 5 mm.

14. The electrode rolling method of claim 11, wherein:
during the induction-heating,
the non-coating portion region of the electrode substrate is heated at a temperature in the range of 100 to 300° C.

* * * * *